Patented Jan. 8, 1952

2,582,114

UNITED STATES PATENT OFFICE 2,582,114

SYNTHESIS OF STYRENE OXIDE

Hans R. Frisch, Montreal, Quebec, Canada, assignor to United States Rubber Company, New York, N. Y., a corporation of New Jersey No Drawing. Application June 7, 1949, Serial No. 97,700

8 Claims. (Cl. 260—348.6)

This invention relates to a method for the economical production of styrene oxide which is a very valuable chemical particularly useful as an intermediate for the preparation of other organic chemicals.

The known methods of making styrene oxide are too expensive to be useful on a commercial scale. One of the best known methods used comprises reacting styrene with peracetic acid, the latter being made by reacting hydrogen peroxide with acetic anhydride. However, this method requires 8 lbs. of acetic anhydride per pound of styrene oxide obtained: the cost of the acetic anhydride required is greater than the value of the styrene oxide produced for ordinary commercial consumption. As a consequence the price of styrene oxide has been too high to justify its wide commercial use. In addition, when the method of manufacture is carried out on a large scale, it involves the handling of large amounts of per-compounds which is not without risks.

I have discovered a simple, safe, economical and convenient method of making styrene oxide which reduces the cost of manufacture thereof to such an extent that it makes feasible its wide industrial use.

My invention is based on the discovery that styrene oxide can be produced in good yields and at low cost from a mixture of styrene chlorohydrin and styrene dichloride (which can conveniently be obtained by bubbling chlorine gas through a mixture of styrene and an aqueous solution of sodium bicarbonate) by heating such a mixture with a solution of a mildly alkaline-reacting material, particularly an alkali metal or an alkaline earth metal salt of a fatty acid, at a temperature of from 70° C. to 90° C. Throughout the reaction, the reaction mixture is maintained non-acid; this may be achieved in any suitable manner, a preferred method involving having present at all times an alkaline earth metal carbonate in amount sufficient to neutralize the fatty acid liberated from the fatty acid salt by the conversion of the styrene chlorohydrin and styrene dichloride to the oxide.

Neutralization of the fatty acid with an alkaline earth metal carbonate, in the manner just described, forms more alkaline earth metal salt of the fatty acid which is then free to participate in the reaction; in this way the amount of such salt needed to be added initially can be greatly reduced.

The method of my invention is preferably carried out in the following manner: A mixture chlorohydrin and styrene dichloride is mixed with calcium acetate in an amount equal to only a fraction of that theoretically required, calcium carbonate in amount sufficient to combine with all of the acetic acid liberated by the reaction and ethyl alcohol of at least 90% strength. The resulting mixture is heated at the refluxing temperature (approximately 80° C.) for from 20 to 30 hours. This effects conversion of the styrene chlorohydrin and styrene dichloride to styrene oxide in yields of at least 80% of the latter based on the styrene chlorohydrin and styrene dichloride charged. After completion of the reaction, the alcohol is distilled from the reaction mixture, preferably under vacuum (the recovered alcohol being re-used), and the residue is then steam-distilled to leave a residue of the polymerized styrene. The distilled oil is separated from the condensed water, dried with sodium sulfate and fractionated under vacuum. Styrene oxide, boiling at 64° C. at 5 mm. pressure, is obtained in 80% or higher yield. The higher boiling fraction (boiling at 93° C. at 5 mm.) consists of unchanged styrene dichloride which is returned to the next batch.

The reactions involved in the practice of my invention may be indicated as follows:

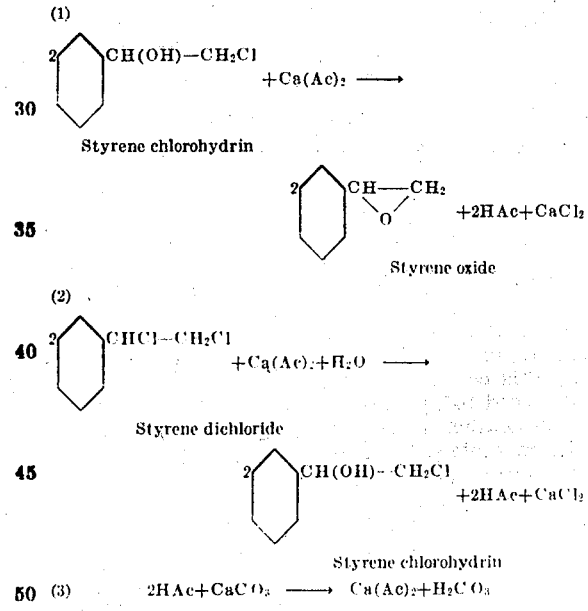

By far the preferred mildly alkaline-reacting material is calcium acetate. However I may use any other mildly alkaline-reacting material, especially an alkali metal or alkaline earth metal salt of a saturated fatty acid such as the sodium, potassium or calcium salts of any of the saturated fatty acids ranging from formic to stearic acid. Examples are sodium acetate, calcium formate, etc. Preference is given to such salts of the lower fatty acids since the alkali metal salts of the higher fatty acids may give rise to foaming difficulties and the alkaline earth metal salts of the higher fatty acids may not exhibit the desired solubility in the lower alkanol. Sodium carbonate can be used but is not especially satisfactory because of the low yields often obtained therewith. It is desirable to avoid more than mildly alkaline conditions because excessively alkaline conditions lead to the formation of phenyl glycol which is to be avoided. Preferably the pH of the reaction mixture is not over 11.

I find that it is necessary to maintain the reaction mixture non-acid throughout because the pressure of acid, such as the acetic acid formed by the reaction, would hydrolize the styrene oxide formed to undesired alpha-phenyl ethyl alcohol.

The reaction temperature is critical. For example, if it is attempted to carry out the reaction at 100° C., substantially complete conversion of the styrene chlorohydrin (both that initially present and that formed from the styrene dichloride) to phenyl glycol takes place. Apparently at 100° C. the hydrolysis of the terminal chlorine proceeds much more rapidly than the desired epoxisation reaction. At temperatures of 70° to 90° C., however, the hydrolysis of the terminal chlorine occurs to a neglible extent.

At temperatures below 70° C. the formation of styrene oxide does not proceed at a rate sufficiently rapid to make the process economical.

The preferred alcohol is ethyl alcohol. Use of ethyl alcohol has the advantage that the reaction mixture boils at that temperature (about 80° C.) which gives optimum results. However other lower alkanols may be used if the pressure or the alcohol mixture is adjusted to give a reaction temperature of from 70° to 90° C. For example methanol may be used at moderately superatmospheric pressures or a mixture of methanol and propanol made to boil at around 80° C. could be used at atmospheric pressure.

The alkanol preferably has a concentration of at least 80% by weight (based on the sum of alkanol and any water present) in the initial reaction mixture. This has the advantage that the liquids present form only a single homogeneous phase. If too much water is present, two separate phases are present and vigorous stirring is necessary to maintain these phases in intimate admixture with one another.

It is preferred to employ an alkanol and an alkaline-reacting material so selected with reference to one another or in such relative amounts that an excessive concentration of the alkaline-reacting material in solution is avoided. Preferably this concentration is at least 1% but does not exceed 10% of the alkaline-reacting material in the solution in the alkanol. Ethyl alcohol and calcium acetate form an almost ideal combination from these standpoints because the solubility of calcium acetate is only about 4 parts in 100 parts of ethyl alcohol. In this way the reaction proceeds at a good rate yet without forming any appreciable amounts of phenyl glycol. Any calcium acetate in excess of that which will dissolve in the alcoholic solution simply remains in undissolved form available to saturate the solution as required.

The mixture of styrene chlorohydrin and styrene dichloride employed as the starting material is usually prepared by bubbling chlorine gas through a suspension of styrene in an aqueous solution of sodium bicarbonate. Polymerization of part of the styrene occurs concurrently but can be greatly suppressed by keeping the reaction mixture at a temperature of around 10° C., as by continually adding ice to the reaction mixture. The reaction of chlorine with styrene under these conditions produces styrene chlorohydrin and at the same time unavoidably produces about an equal amount of styrene dichloride. Evidently the increase of sodium chloride in the solution operates by virtue of the "common ion action" to suppress the hydrolysis of the chlorine into hypochlorous acid and hydrochloric acid and thus to form styrene dichloride at the same time as the chlorohydrin. It is impossible to separate styrene chlorohydrin (B. P. 114° C. at 14 mm.) and styrene dichloride (B. P. 115° C. at 15 mm.) by fractional distillation because of the closeness of their boiling points and therefore it is necessary to work with the mixture. My process is very well adapted to effect conversion of both components of the mixture to styrene oxide in good yield.

If a mixture of styrene chlorohydrin and styrene dichloride is treated with hot alcoholic alkali metal hydroxide, the styrene chlorohydrin is converted to styrene oxide in good yield. However, the styrene dichloride is converted to omega-chlorostyrene which, due to the closeness of its boiling point to that of styrene oxide, cannot be separated therefrom by fractional distillation. Hence this method of manufacturing styrene oxide cannot be used. In contrast, as just indicated, the process of my invention converts both the styrene chlorohydrin and the styrene dichloride to the desired styrene oxide in good yield.

The following examples illustrate my invention in more detail:

EXAMPLE 1

A. *Preparation of mixture of styrene chlorohydrin and styrene dichloride*

Into a three neck three liter flask, provided with stirrer, thermometer and reflux condenser there are introduced one liter of cold water, 165 g. (2 mol) sodium bicarbonate and 208 g. (2 mol) styrene. While stirring the mixture, chlorine gas is bubbled through the mixture. Crushed ice is added occasionally to keep the reaction mixture at a temperature of 10° C. After 25 minutes the top layer of styrene is changed into a bottom oil. Reaction is complete when all the sodium bicarbonate has dissolved, when no more carbon dioxide evolves, when a sample of the water phase gives no more precipitate with a solution of barium chloride, and when the liquid turns to a yellow-greenish color. The heavy oil is separated from the aqueous layer and washed with water. It weighs about 350 g. and contains about 45% by weight of styrene chlorohydrin, about 45% of styrene dichloride and about 10% of polystyrene.

B. *Conversion to styrene oxide*

The crude oil obtained in A is added to a liter of 90% ethanol. To this mixture there are added 88 g. calcium acetate monohydrate (½ mol) and 100 g. calcium carbonate in the form of marble chips (1 mol). The mixture is refluxed for 20 to 30 hours. The ethanol is distilled off (to be re-used), and the residue is steam distilled. It yields 250 g. of a heavy oil. Fractionation of this oil under vacuum in the presence of marble chips yields a first fraction of styrene boiling below 50° C. at 2 mm. and weighing 10 g., a second fraction of styrene oxide boiling at 50–70° C. at 3 mm. and weighing 220 g. and a third fraction of styrene dichloride boiling at 70–93° C. at 5 mm. and weighing 25 g. The second fraction is redistilled and yields 200 g. of a fraction composed of substantially pure styrene oxide, boiling at 75–78° C. at 10 mm. (83% theory).

EXAMPLE 2

There is taken 175 g. of a crude mixture of styrene chlorohydrin and styrene dichloride, prepared in the same manner as set forth in Part A of Example 1. This is steam distilled to remove the polymers. The steam distillation yields 122 g. of a purified mixture of styrene chlorohydrin and styrene dichloride in approximately equal proportions. This purified mixture is then treated with 37 g. (½ mol) of sodium acetate and 100 g. (1 mol) of calcium carbonate in the form of marble chips, in the same manner as set forth in Part B of Example 1. Upon fractional distillation of the heavy oil which is obtained, there is obtained a first fraction of styrene oxide boiling at 75–78° C. at 10 mm. and weighing 85 g., a second fraction of styrene dichloride boiling at 92–96° C. at 10 mm. and weighing 18 g. and a third residual fraction weighing 15 g.

Having thus described my invention, what I claim and desire to protect by Letters Patent is:

1. A method of preparing styrene oxide from a mixture of styrene chlorohydrin and styrene dichloride which comprises heating said mixture with a solution of an alkaline earth metal salt of a lower saturated fatty acid in a lower alkanol at a temperature of from 70° C. to 90° C. while maintaining the reaction mixture non-acid.

2. A method of preparing styrene oxide from a mixture of styrene chlorohydrin and styrene dichloride which comprises heating said mixture with a solution of an alkaline earth metal salt of a lower saturated fatty acid in a lower alkanol at a temperature of from 70° C. to 90° C. in the presence of an alkaline earth metal carbonate in amount sufficient to neutralize the fatty acid liberated from said salt by the reaction.

3. A method of preparing styrene oxide from a mixture of styrene chlorohydrin and styrene dichloride which comprises heating said mixture with a solution of calcium acetate in a lower alkanol at a temperature of from 70° C. to 90° C. in the presence of calcium carbonate in amount sufficient to neutralize the acetic acid liberated from the calcium acetate by the reaction.

4. A method as set forth in claim 3 wherein the amount of calcium acetate present is equal to one-half mol per mol of said calcium carbonate.

5. A method of preparing styrene oxide from a mixture of styrene chlorohydrin and styrene dichloride which comprises heating at the refluxing temperature a reaction mixture comprising said mixture and a solution of an alkaline earth metal salt of a lower saturated fatty acid in ethyl alcohol while maintaining the reaction mixture non-acid.

6. A method of preparing styrene oxide from a mixture of styrene chlorohydrin and styrene dichloride which comprises heating at the refluxing temperature a reaction mixture comprising said mixture and a solution of calcium acetate in ethyl alcohol, the amount of calcium acetate being equal to one-half mol per mol of calcium carbonate present, and having present throughout the reaction calcium carbonate in amount sufficient to react with the acetic acid liberated by the reaction.

7. A method as set forth in claim 6 wherein said mixture is heated at the refluxing temperature for from 20 to 30 hours.

8. A method of preparing styrene oxide from a mixture of styrene chlorohydrin and styrene dichloride which comprises heating at the refluxing temperature a reaction mixture comprising said mixture and a solution of calcium acetate in ethyl alcohol while maintaining the reaction mixture non-acid.

HANS R. FRISCH.

REFERENCES CITED

The following references are of record in the file of this patent:

UNITED STATES PATENTS

| Number | Name | Date |
|---|---|---|
| 1,996,638 | Britton | Apr. 2, 1935 |
| 2,061,377 | Groll | Nov. 17, 1936 |
| 2,116,439 | Levine | May 3, 1938 |
| 2,232,910 | Green | Feb. 25, 1941 |
| 2,237,284 | Alquist | Apr. 8, 1941 |